United States Patent
Yamamura

(10) Patent No.: US 7,319,539 B2
(45) Date of Patent: Jan. 15, 2008

(54) INFORMATION PROCESSING APPARATUS, CONTROL METHOD FOR INFORMATION PROCESSING APPARATUS, CONTROL PROGRAM, AND PRINT SYSTEM

(75) Inventor: Shinichi Yamamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1053 days.

(21) Appl. No.: 10/401,838

(22) Filed: Mar. 31, 2003

(65) Prior Publication Data

US 2003/0189718 A1 Oct. 9, 2003

(30) Foreign Application Priority Data

Apr. 8, 2002 (JP) .............................. 2002-105295
Mar. 11, 2003 (JP) .............................. 2003-065635

(51) Int. Cl.
*G06F 15/00* (2006.01)

(52) U.S. Cl. ..................................... 358/1.15; 358/1.12

(58) Field of Classification Search ............... 358/1.15, 358/1.13; 717/101, 1.104; 399/81, 77; 412/1, 412/6, 33; 709/242; 402/15, 64

See application file for complete search history.

(56) References Cited

U.S. PATENT DOCUMENTS 6,417,931 B2 7/2002 Mori et al. ................. 358/1.15
2001/0024291 A1 9/2001 Mori et al. ................. 358/1.12
2001/0052994 A1* 12/2001 Murata ....................... 358/1.15
2006/0262338 A1* 11/2006 Momose et al. ........... 358/1.13

FOREIGN PATENT DOCUMENTS

JP 11-99724 4/1999

* cited by examiner

*Primary Examiner*—Samir Ahmed
*Assistant Examiner*—Saeid Ebrahimi
(74) *Attorney, Agent, or Firm*—Fitzpatrick, Cella, Harper & Scinto

(57) ABSTRACT

To automatically set a binding margin (blank from a folding line of a sheet center) sheet by sheet in the case of performing middle binding booklet printing, there is provided an information processing apparatus having: means for receiving designation of the middle binding booklet printing; memory means for storing a preset blank adjustment amount in booklet printing; and blank adjusting means for, when the designation of the middle binding booklet printing is received, automatically adjusting a blank amount from a binding position sheet by sheet on the basis of the blank adjustment amount stored in the memory means.

18 Claims, 11 Drawing Sheets

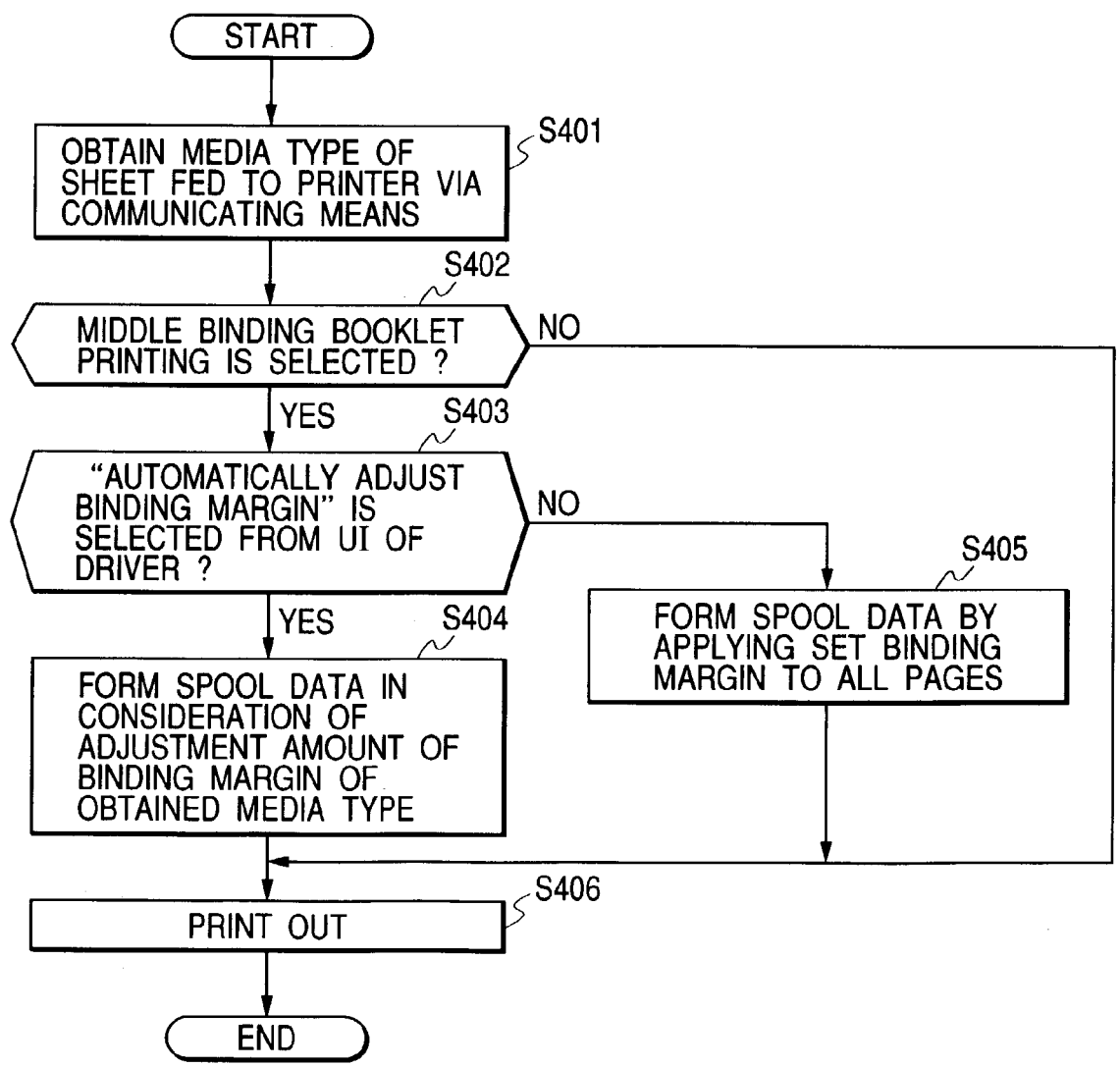

FIG. 9

| NAME OF SHEET | ADJUSTMENT AMOUNT |
|---|---|
| UNDEFINED | 0.00045mm |
| PLAIN | 0.00045mm |
| HEAVY PAPER | 0.00121mm |
| THIN PAPER | 0.00021mm |
| PRE-PRINTED | 0.00045mm |
| TRANSPARENCY | 0.00050mm |
| RECYCLED | 0.00045mm |
| LETTERHEAD | 0.00098mm |
| TRACING PAPER | 0.00050mm |
| LABELS | 0.00070mm |
| CARD STOCK | 0.00098mm |
| BOND PAPER | 0.00120mm |

FIG. 12

```
@PJL COMMENT CANPJL SET FACEDOWN = GENERICON
@PJL COMMENT CANPJL SET PAGEORDER = REVERSE
@PJL COMMENT CANPJL SET BOOKLET = ON
@PJL COMMENT CANPJL SET GUTTER = 30
@PJL COMMENT CANPJL SET GAP = 00045
@PJL COMMENT CANPJL SET DARKNESS = 3
@PJL COMMENT CANPJL SET DOCNAME = SHINYAMA
```

[ JOB START COMMAND ]

JL Command

THE 1ST PAGE
DRAW COMMAND PORTION 1
DRAW COMMAND PORTION 2
DRAW COMMAND PORTION 3

THE 2ND PAGE
DRAW COMMAND PORTION 1
DRAW COMMAND PORTION 2
DRAW COMMAND PORTION 3

THE 3RD PAGE
DRAW COMMAND PORTION 1
DRAW COMMAND PORTION 2
DRAW COMMAND PORTION 3

INFORMATION PROCESSING APPARATUS, CONTROL METHOD FOR INFORMATION PROCESSING APPARATUS, CONTROL PROGRAM, AND PRINT SYSTEM

BACKGROUND OF THE INVENTION

1. Field of the Invention

The invention relates to an information processing apparatus for executing a process for middle binding booklet printing by a printing apparatus which can perform the middle binding booklet printing, a control method for the information processing apparatus, a control program, and a print system comprising the printing apparatus and the information processing apparatus.

2. Related Background Art

Hitherto, a print system comprising a printer (printing apparatus) and clients (information processing apparatuses) such as personal computers or the like has been well known. In the case of performing middle binding booklet printing in such a conventional print system, jobs formed on the clients are subjected to the middle binding booklet printing by changing page order by a printer driver or jobs from a head page sent from the printer driver are subjected to the middle binding booklet printing by changing the page order on the printer side. In U.S. Pat. No. 6,417,931 (Japanese Patent Application Laid-open No. 11-99724) filed by the present applicant, a print layout apparatus in which a blank from a portion of a folding line which is formed when a sheet of paper is folded double to a printing range can be set as a binding margin has been disclosed.

According to such a print layout apparatus, as shown in FIGS. 7 and 8 of the above Official Gazette, the blank portion serving as a binding margin upon booklet printing can be manually set.

However, upon setting of the binding margin (blank) in the print system including such a print layout apparatus, only similar setting can be made to all pages of a print job for performing the booklet printing both on the printer side and on the printer driver side. Since the blank portion is manually set, very complicated work is compelled to the user.

If the middle binding booklet printing is executed, the inside paper overflows the outside paper (the side serving as an obverse sheet/reverse sheet) with an increase in the number of sheets which are necessary for booklet printing. That is, edge portions of the sheet become a stairway-like shape. In such a case, the edge portions are trimmed in order to make a resultant book more attractive. However, a trimming range of the sheet on the inner side increases more. If printing areas of all sheets are the same range, that is, when the binding margins of all of the sheets are the same, if the trimming is performed, the printing area of the sheet on the inner side is one-sided to the edge portion. There is also a case where the range including the print area is trimmed.

A width of folding line which is obtained when a sheet of paper is folded changes in dependence on a thickness or rigidity of the sheet to be printed. That is, the binding margin has to be taken into consideration in dependence on not only the number of sheets but also the thickness or rigidity of the sheet.

Particularly, in the case of printing a pamphlet or the like, a plurality of types of sheets of different thicknesses are often used upon printing of one copy. In such a case, there is a problem such that even if the blank is manually adjusted by the above print layout apparatus, since the blank cannot be designated every page, if it is adjusted to a blank amount which is necessary in a thick sheet, a blank amount of a thin sheet increases more than it is necessary.

Further, in the above print layout apparatus, since the blank amount is manually adjusted, it is necessary to execute test printing many times in order to obtain a desired binding margin, so that there is a case where the sheets are consumed in vain.

SUMMARY OF THE INVENTION

It is an object of the invention to provide an information processing apparatus which can execute booklet printing of higher precision without causing the foregoing problems, a control method for the information processing apparatus, a control program, and a print system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a flowchart showing a flow for an adjustment amount calculation processing operation of a binding margin upon booklet printing in the print system according to the first embodiment of the invention;

FIG. 9 is a diagram showing an example of a table in which adjustment amounts of the binding margin set every media type are collectively shown as numerical values in the print system according to the first embodiment of the invention;

FIG. 12 is a diagram showing examples of an interface between a printer driver and an output engine by command levels in the case where the layout operation of the booklet printing is executed on the printer side in the print system according to the fourth embodiment of the invention.

DETAILED DESCRIPTION OF THE PREFERRED EMBODIMENTS

Embodiments of the invention will be described hereinbelow with reference to the drawings.

According to the invention, in a print system in which information of a printing apparatus (printer) called dynamic configuration can be obtained by a printer driver in accordance with a bidirectional communication protocol, if a type of media of a sheet which is used by the printer driver is obtained, by automatically setting an adjustment amount of a binding margin which has previously been calculated, the booklet printing of high precision can be executed without causing an adjustment in the booklet printing.

First Embodiment

First, the first embodiment of the invention will be described with reference to the drawings.

Figure 1:
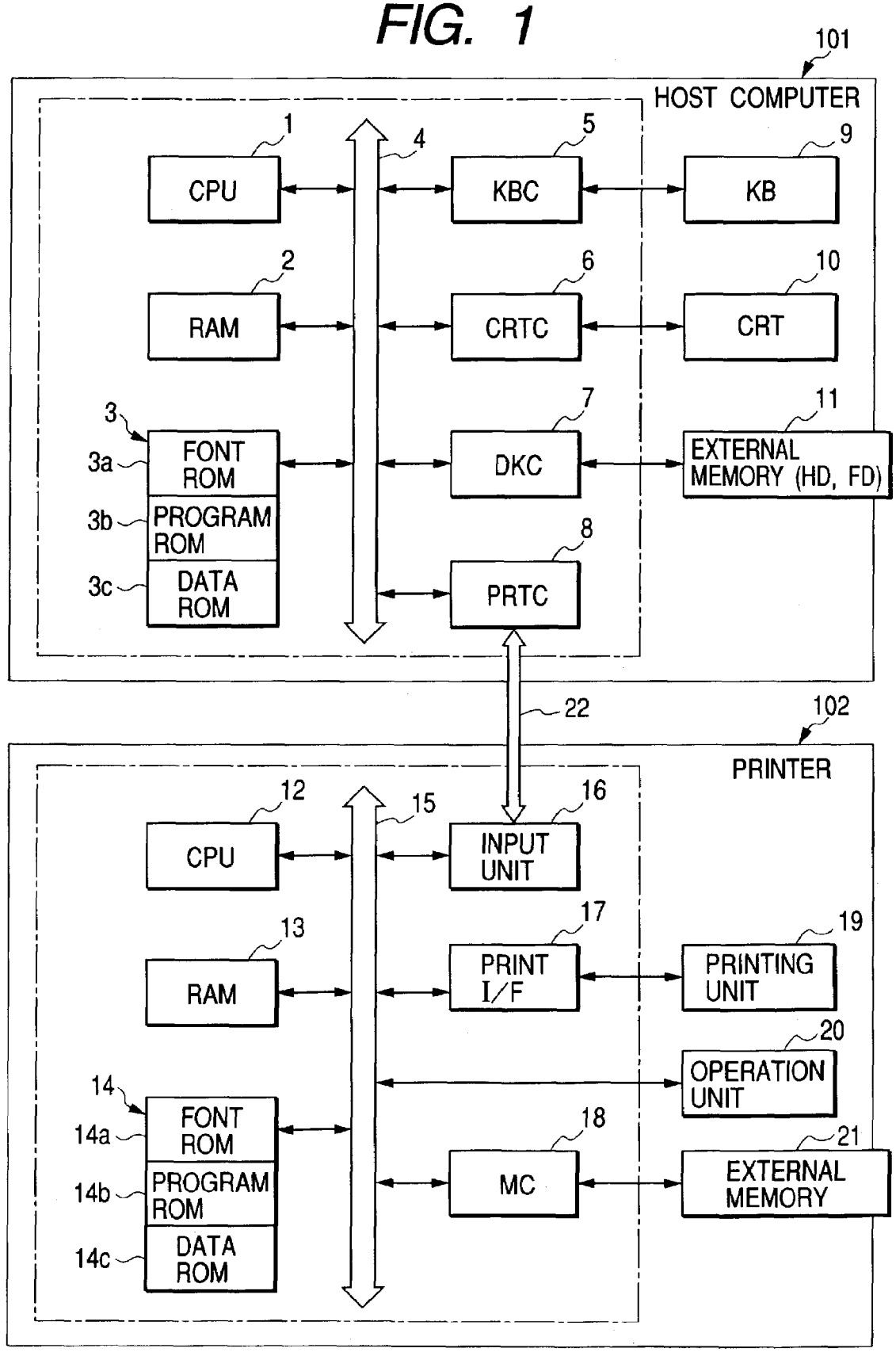
FIG. 1 is a block diagram showing a construction of a print system according to the first embodiment of the invention.

FIG. 1 is a block diagram showing a construction of a print system according to the first embodiment of the invention.

The invention can be applied to a single apparatus, a system comprising a plurality of apparatuses or a system which is connected via a network such as LAN (Local Area Network), WAN (Wide Area Network), or the like and in which processes are executed so long as functions of the invention are executed by them.

As shown in FIG. 1, the print system according to the embodiment comprises: a host computer 101 serving as an information processing apparatus; and a printer 102 serving as a printing apparatus. The print system can be also replaced with a system including a server apparatus connected respectively to a plurality of host computers and a plurality of printing apparatuses via a network.

The host computer 101 has: a CPU (Central Processing Unit) 1; a RAM (Random Access Memory) 2; a ROM (Read Only Memory) 3; a system bus 4; a keyboard controller (KBC) 5; a CRT controller (CRTC) 6; a disk controller (DKC) 7; a printer controller (PRTC) 8; a keyboard (KB) 9; a CRT display (CRT) 10; and an external memory (HD, FD) 11.

On the basis of a document processing program or the like stored in a program ROM 3b in the ROM 3 or the external memory 11, the CPU 1 executes a process for a document in which a figure, an image, characters, a table (including a spreadsheet or the like), and the like exist mixedly. The CPU 1 integratedly controls the devices connected to the system bus 4. The RAM 2 functions as a main memory, a work area, or the like of the CPU 1. The ROM 3 has a font ROM 3a, the program ROM 3b, and a data ROM 3c. An operating system program (hereinafter, referred to as an OS) and the like as a control program for the CPU 1 are stored in the program ROM 3b in the ROM 3. Font data and the like which are used upon execution of the document processes are stored in the font ROM 3a in the ROM 3. Various data which is used upon execution of the document processes or the like is stored in the data ROM 3c in the ROM 3.

The system bus 4 electrically connects the component elements of the host computer 101. The keyboard controller 5 controls a key input from the keyboard 9 or a pointing device (not shown). The CRT controller 6 controls a display of the CRT display 10. The disk controller 7 controls an access to the external memory 11 for storing a boot program, various applications, font data, a user file, an edit file, a printer control command forming program (hereinafter, referred to as a printer driver), and the like. The printer controller 8 is connected to the printer 102 via a bidirectional interface 22 and executes a communication control process with the printer 102.

The keyboard 9 is used to input various information and has a number of keys. The CRT display 10 displays information onto a display screen. The external memory 11 comprises a hard disk (HD), a floppy (registered trademark) disk (FD), or the like. The OS as a control program for the CPU 1, font data which is used upon execution of the document processes, various data which is used when the document processes or the like are executed, and the like are stored in the external memory 11.

The CPU 1 executes, for example, a developing (rasterizing) process of an outline font into a display information RAM set on the RAM 2, thereby enabling WYSIWYG (What You See Is What You Get) on the CRT 10 to be realized. The CPU 1 opens various registered windows and executes various data processes on the basis of commands instructed by a mouse cursor or the like (not shown) on the CRT 10. When printing is executed, the user opens the window regarding the print setting and can set a print processing method to the printer driver including setting of the printer or selection of a print mode.

The printer 102 comprises: a CPU 12; a RAM (Random Access Memory) 13; a ROM (Read Only Memory) 14, a system bus 15, an input unit 16; a print interface (I/F) 17; a memory controller (MC) 18, a printing unit (printer engine) 19, an operation unit 20; and an external memory 21.

The CPU 12 controls the whole printer 102 and outputs an image signal as output information to the printing unit 19 which is connected to the system bus 15 on the basis of a control program or the like stored in a program ROM 14b in the ROM 14 or a control program or the like stored in the external memory 21. The CPU 12 can communicate with the host computer 101 via the input unit 16 and can notify the host computer 101 of information or the like in the printer 102. The RAM 13 functions as a main memory, a work area, or the like for the CPU 12 and is constructed in a manner such that its memory capacity can be expanded by an option RAM which is connected to an extending port (not shown).

The RAM 13 is used as an output information rasterizing area, an environmental data storing area, an NVRAM, or the like. The ROM 14 has a font ROM 14a, the program ROM 14b, and a data ROM 14c. A control program and the like for the CPU 12 are stored in the program ROM 14b in the ROM 14. Font data and the like which are used when the output information is formed are stored in the font ROM 14a in the ROM 14. Information and the like which are used on the host computer in the case of a printer without the external memory 21 such as a hard disk or the like are stored in the data ROM 14c in the ROM 14.

The system bus 15 electrically connects component elements of the printer 102. The input unit 16 is used to input various information. Switches for operating in the operation unit 20, an LED display, and the like are arranged in the input unit 16. The print interface 17 transmits and receives information to/from the printing unit 19. The memory controller (MC) 18 controls the external memory 21. The printing unit (printer engine) 19 prints print data onto a print sheet or the like and outputs it. The operation unit 20 operates the printer 102. The external memory 21 comprises a hard disk (HD), an IC card, or the like and its access is controlled by the memory controller 18. The external memory 21 is connected as an option and used for storing font data, an emulation program, form data, and the like, and used as a memory for spooling the rasterized print data.

The external memory 21 is not limited to one memory but can be constructed in a manner such that a plurality of memories such as option card to which a built-in font is added, spool memory of the rasterized print data, and external memory in which a program for interpreting printer control languages of different language systems has been stored can be connected.

Further, it is also possible to provide an NVRAM (not shown) and store printer mode setting information from the operation unit 20.

Figure 2:
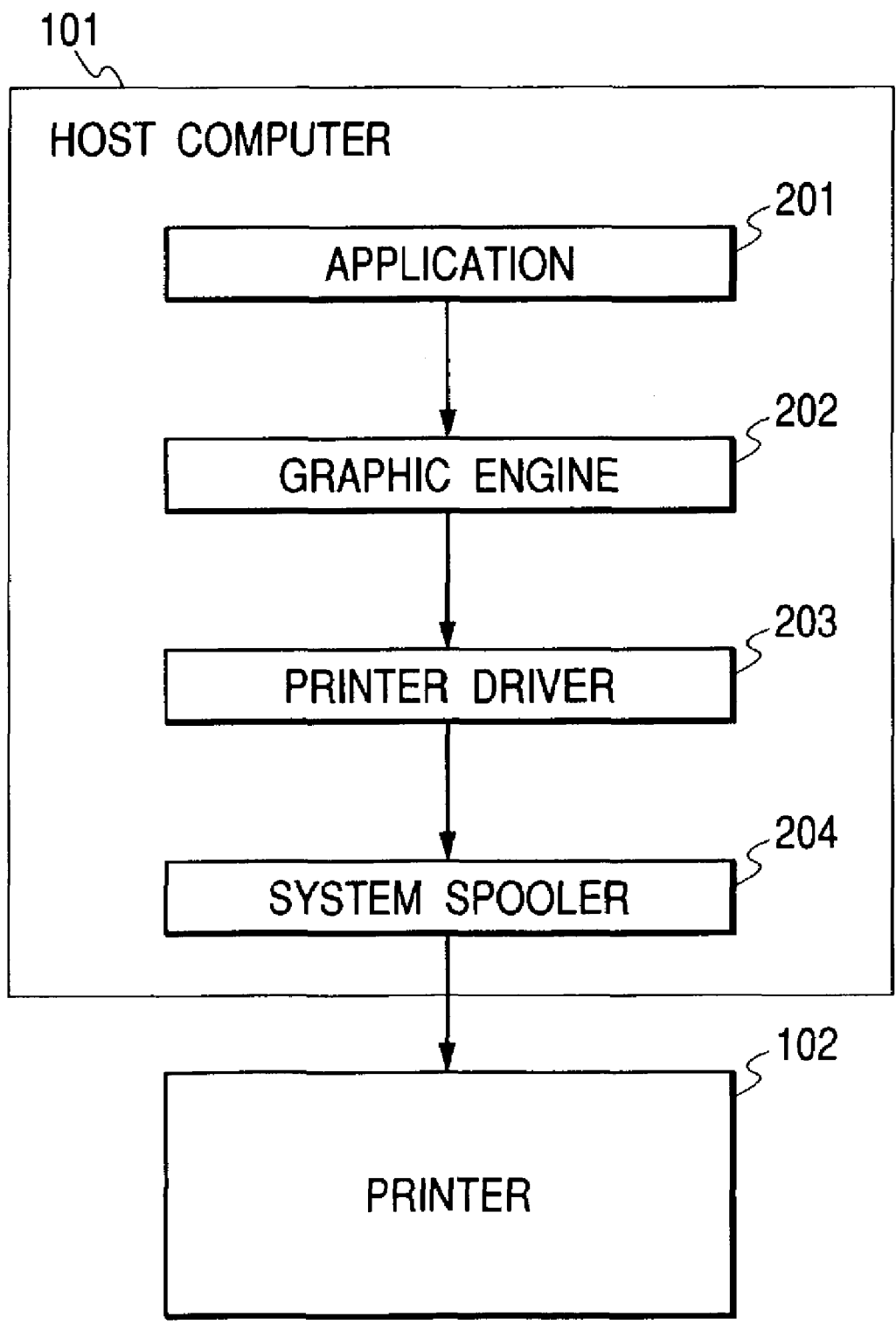
FIG. 2 is a block diagram for explaining a print data forming method of a typical print data forming unit of a host computer in the print system according to the first embodiment of the invention.

FIG. 2 is a diagram showing a construction of a typical print processing unit in the host computer 101 to which the printing apparatus such as a printer or the like is directly connected or connected via a network.

In FIG. 2, an application 201, a graphic engine 202, a printer driver 203, and a system spooler 204 are program modules which exist as files stored in the external memory 11 of the host computer 101 in FIG. 1, are loaded into the RAM 2 of the host computer 101, and are executed by the OS or a module which uses the corresponding module when it is executed. The application 201 and the printer driver 203 can be added to the FD of the external memory 11 of the host computer 101, a CD-ROM (not shown), or an HD of the external disk 11 of the host computer 101 via the network (not shown). Although the application 201 stored in the external memory 11 is loaded into the RAM 2 of the host computer 101 and executed, when printing is executed from the application 201 to the printer 102, print data is outputted (drawn) by using the graphic engine 202 which has similarly been loaded into the RAM 2 and can be executed.

The graphic engine 202 similarly loads the printer driver 203 prepared every printing apparatus into the RAM 2 from the external memory 11 of the host computer 101 and sets an output of the application 201 into the printer driver 203. The graphic engine 202 converts a GDI (Graphic Device Interface) function which is received from the application 201 into a DDI (Device Driver Interface) function and outputs the DDI function to the printer driver 203. On the basis of the DDI function received from the graphic engine 202, the printer driver 203 converts it into a control command, for example, a PDL (Page Description Language) which can be recognized by the printer 102. The converted printer control command passes through the system spooler 204 loaded into the RAM 2 of the host computer 101 by the OS and is outputted as print data to the printer 102 via the interface 22.

Figure 3:
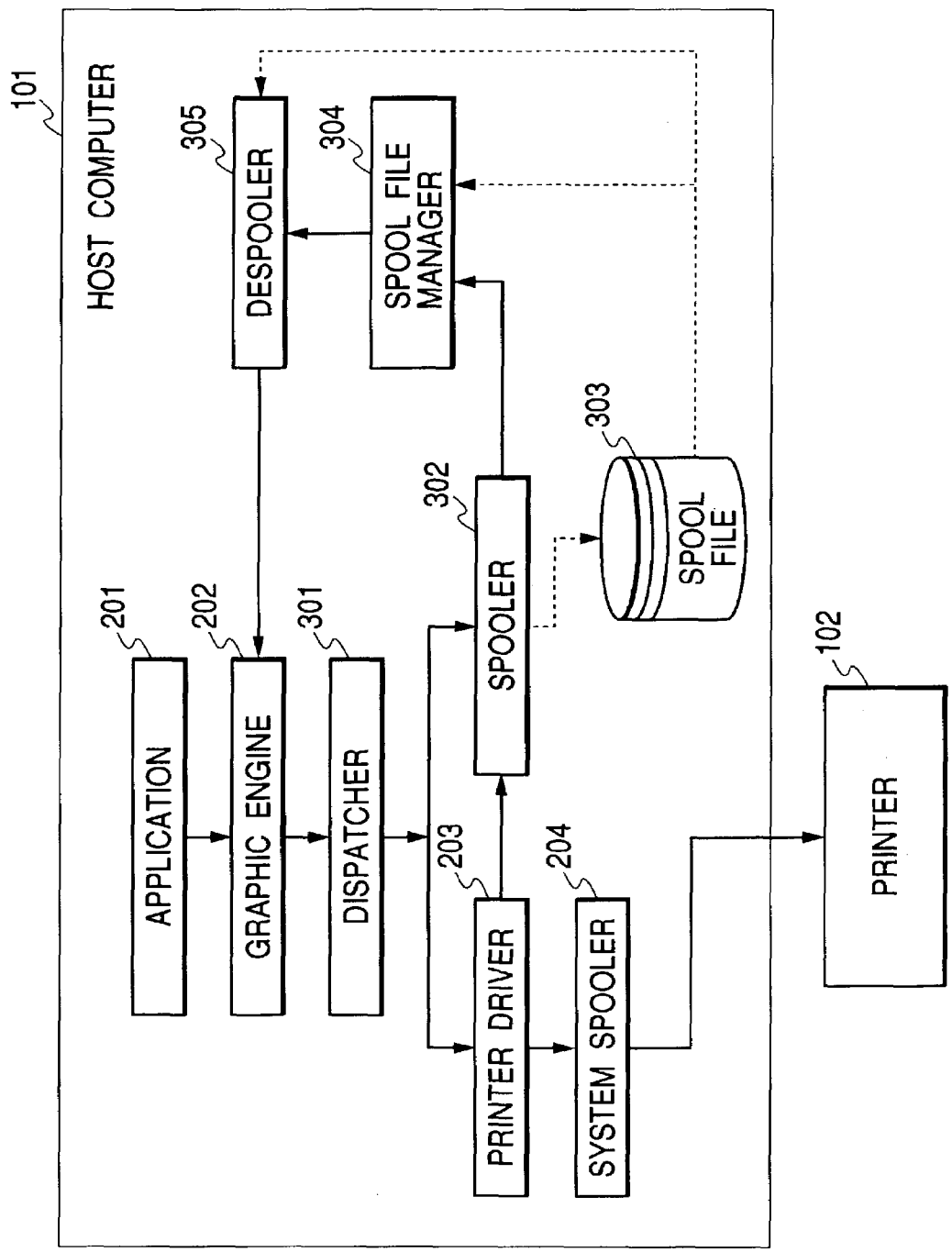
FIG. 3 is a block diagram for explaining a print data forming method of a print data forming unit for forming an intermediate code of the host computer in the print system according to the first embodiment of the invention.

The print system according to the embodiment has a construction such that in addition to the print system comprising the printer 102 and the host computer 101 shown in FIG. 2, the print data from the application is temporarily spooled as intermediate code data as shown in FIG. 3.

FIG. 3 is an expanded diagram of the print system shown in FIG. 2 and has a construction such that when a print command is sent from the graphic engine 202 to the printer driver 203, a spool file 303 comprising intermediate codes is temporarily formed.

In the print system shown in FIG. 2, the application 201 is released from the printing process at timing when the printer driver 203 has finished the conversion of all print commands from the graphic engine 202 into control commands for the printer 102.

In the print system shown in FIG. 3, it is released at timing when a spooler 302 has converted all of the print commands into intermediate code data and outputted them to the spool file 303. Ordinarily, processing time which is required in the latter system is shorter than that in the former system. In the print system shown in FIG. 3, contents of the spool file 303 can be modified. Thus, a function which is not provided for the application, that is, a function such as enlargement/reduction, a function such that a plurality of pages are reduced into one page and printed, or the like can be realized for the print data from the application.

For the purpose of realizing those objects, the print system shown in FIG. 2 is expanded so as to spool by the intermediate code data as shown in FIG. 3.

To modify the print data, usually, such a modifying mode is set from a window that is provided by the printer driver 203 and the printer driver 203 stores the set contents into the RAM 2 of the host computer 101 or into the external memory 11.

FIG. 3 will be described in detail hereinbelow. As shown in FIG. 3, according to the expanded processing system, a dispatcher 301 receives the print command from the graphic engine 202. If the print command received by the dispatcher 301 from the graphic engine 202 is the print command issued from the application 201 to the graphic engine 202, the dispatcher 301 loads the spooler 302 stored in the external memory 11 of the host computer 101 into the RAM 2 of the host computer 101 and sends the print command to the spooler 302 instead of the printer driver 203.

The spooler 302 converts the received print command into an intermediate code and outputs it to the spool file 303. The spooler 302 obtains modification setting contents regarding the print data set into the printer driver 203 from the printer driver 203 and stores them into the spool file 303.

Although the spool file 303 is formed as a file onto the external memory 11 of the host computer 101, it can be formed onto the RAM 2 of the host computer 101. Further, the spooler 302 loads a spool file manager 304 stored in the external memory 11 of the host computer 101 into the RAM 2 of the host computer 101 and notifies the spool file manager 304 of a forming situation of the spool file 303. After that, the spool file manager 304 discriminates whether the printing can be performed in accordance with the contents of the modification setting regarding the print data stored in the spool file 303 or not.

If the spool file manager 304 determines that the printing can be performed by using the graphic engine 202, a despooler 305 stored in the external memory 11 of the host computer 101 is loaded into the RAM 2 of the host computer 101. The spool file manager 304 instructs the despooler 305 to executes the printing process of the intermediate codes described in the spool file 303.

The despooler 305 modifies the intermediate codes included in the spool file 303 in accordance with the contents of the modification setting included in the spool file 303 and outputs the modified codes again via the graphic engine 202.

If the print command received by the dispatcher 301 from the graphic engine 202 is the print command issued from the despooler 305 to the graphic engine 202, the dispatcher 301 sends the print command to the printer driver 203 instead of the spooler 302.

The printer driver 203 forms a printer control command and outputs it to the printer 102 via the system spooler 204.

FIG. 4 is a flowchart showing a flow for a blank amount calculation processing operation of a binding margin upon booklet printing. The "binding margin" here denotes a blank amount from the center of a printing area for printing two logical pages which are allocated to the right and left from the center of one sheet of paper upon middle binding booklet printing.

Figure 5A:
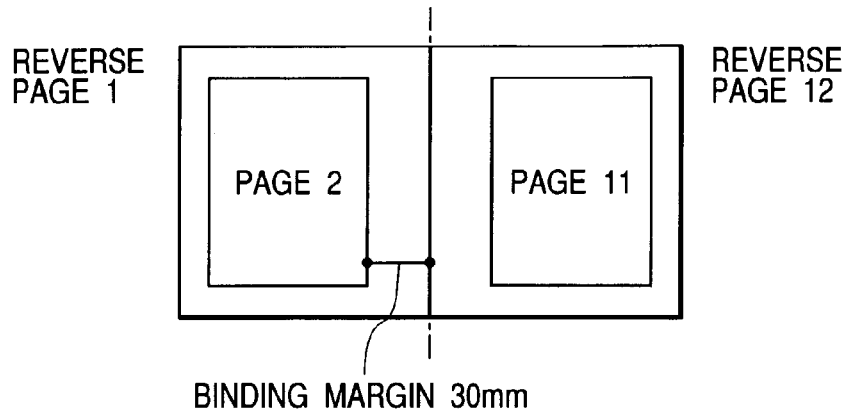
FIGS. 5A, 5B and 5C are diagrams showing processes in the case where a booklet binding margin of 30 mm has been set and a type of a media which is used is (plain) in the print system according to the first embodiment of the invention.
Figure 5B:
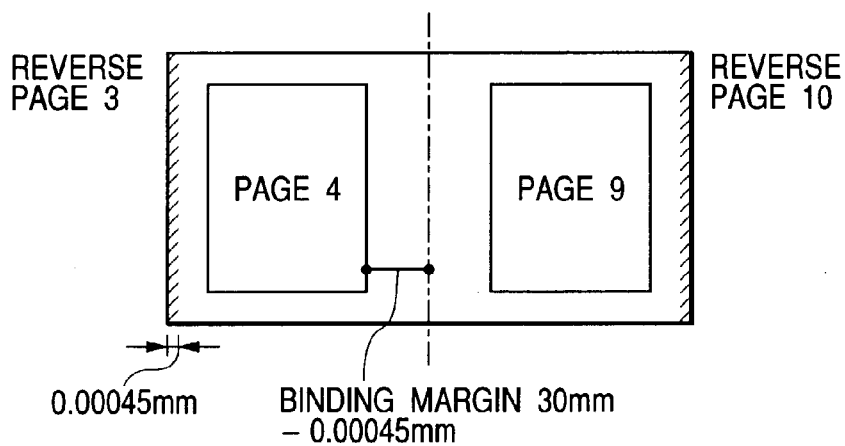
Figure 5C:
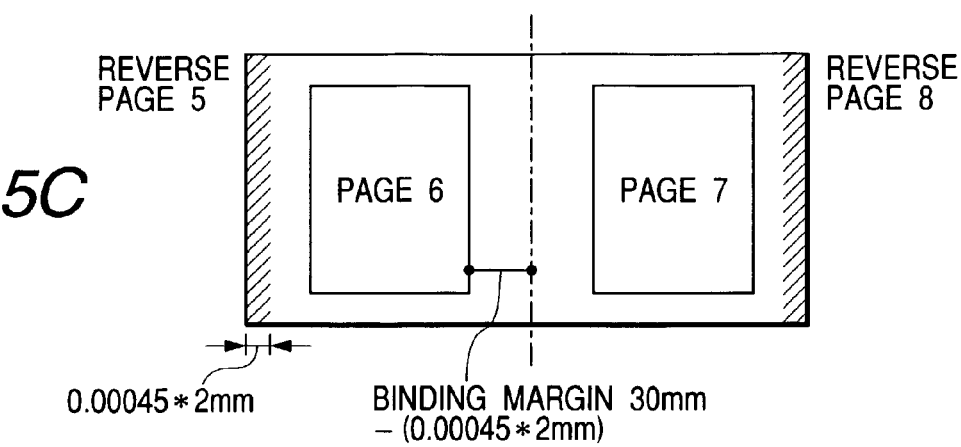

FIGS. 5A, 5B and 5C are diagrams showing a layout in the case where a booklet binding margin of 30 mm has been set and a type of a media which is used is (plain).

Figure 6:
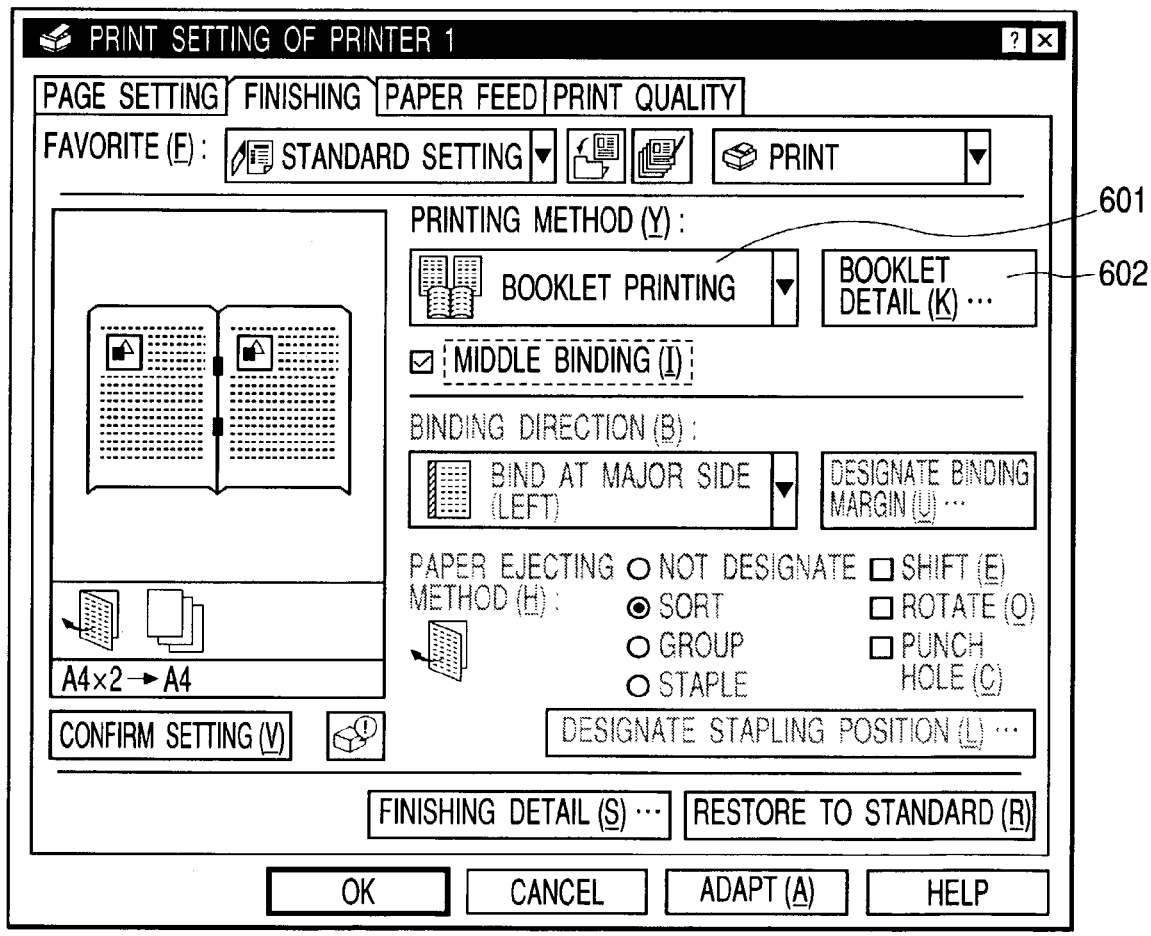
FIG. 6 is a diagram showing an example of a UI of a basic setting display screen for selecting the booklet printing from a user interface of a printer driver in the print system according to the first embodiment of the invention.

FIG. 6 is a diagram showing an example of a UI for setting "finishing" in a user interface of the printer driver 203. In this display screen, if the user designates the middle binding booklet printing for a desired document, by selecting the booklet printing and, further, marking a check box of the middle binding, the printer driver 203 can receive the designation of the middle binding booklet printing.

Figure 7:
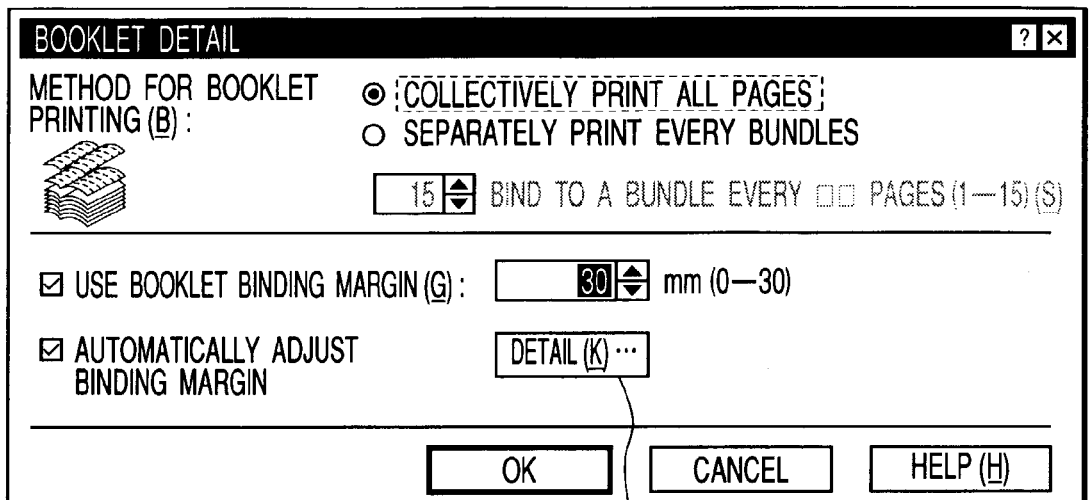
FIG. 7 is a diagram showing an example of a UI of a booklet detail display screen which is displayed when the booklet printing and middle binding are designated and a booklet detail button is pressed in the basic setting display screen shown in FIG. 6.

FIG. 7 is a diagram showing an example of a UI of a booklet detail display screen which is displayed when booklet printing 601 is selected and a booklet detail button 602 is pressed in the basic setting display screen shown in FIG. 6. In this display screen, the user marks a check box of "Automatically adjust binding margin", so that the printer driver 203 can receive the designation such that the blank (binding margin) from the center is automatically adjusted sheet by sheet.

Figure 8:
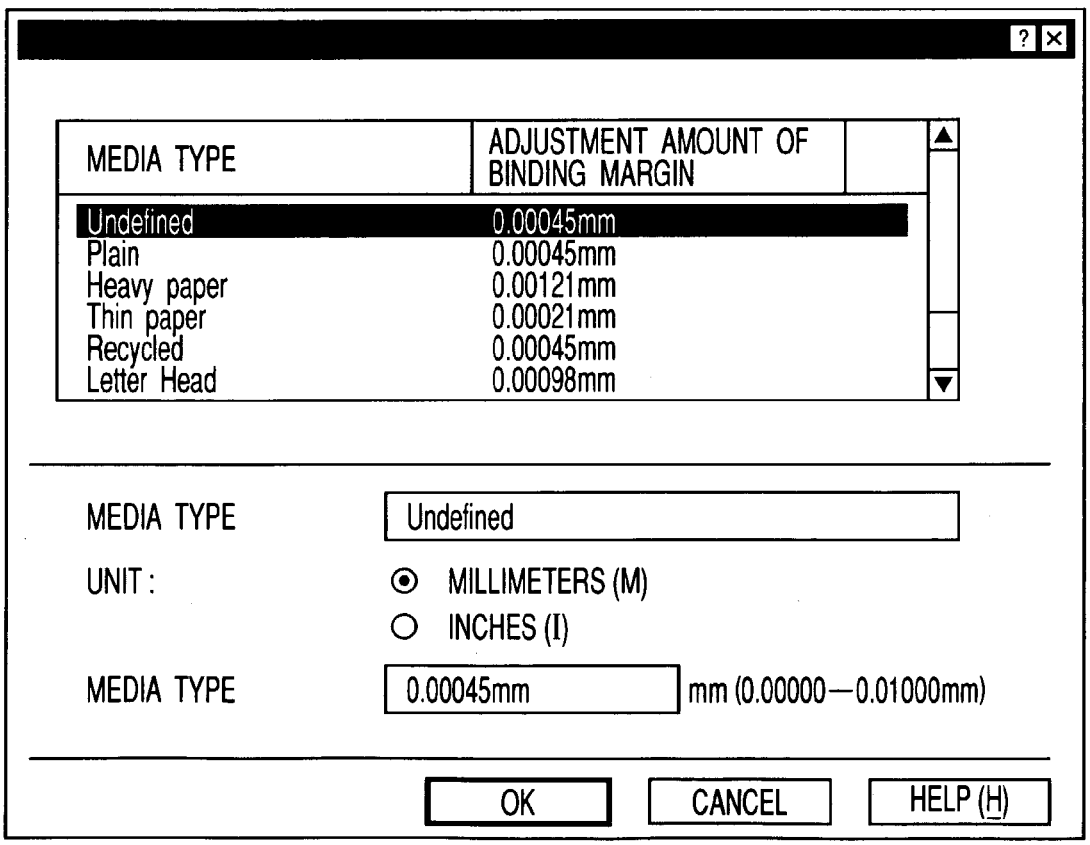
FIG. 8 is a diagram showing an example of a UI of a detail display screen which is displayed when a detail button is pressed in the booklet detail display screen shown in FIG. 7.

FIG. 8 is a diagram showing an example of a UI of a detail setting display screen which is displayed when a detail button 701 is pressed in the booklet detail display screen shown in FIG. 7. FIG. 8 will be explained in conjunction with the second embodiment.

FIG. 9 is a diagram showing an example of a table in which adjustment values of the binding margin set every media type are collectively shown as numerical values.

The print system according to the embodiment will be described in detail hereinbelow mainly with reference to the flowchart shown in FIG. 4 together with FIGS. 5A, 5B, 5C, 6, 7, 8 and 9.

In FIG. 4, in step S401, the host computer and the printer transmit and receive information via a network (communicating means) such as an SNMP or the like which can make bidirectional communication.

At this time, trigger timing for obtaining information of an apparatus can be set by the printer driver 203 or the controller or the like provided for the printer 102. The timing for obtaining the apparatus information can be set to timing when the user makes an instruction from a graphic user interface of the printer driver 203 or timing when he makes an instruction from the operation of the operation unit 20 or the like of the printer 102. There is also a method of automatically transmitting and receiving the apparatus information every set time. Thus, the printer driver 203 can obtain the media type of the print sheet enclosed in the printer 102. The obtained media type information can be stored into the RAM 2, data ROM 3c, or the like of the host computer 101.

It is also possible to construct in a manner such that the media type is obtained on a unit basis of a cassette or a tray provided for the printer and the apparatus is provided with a UI such that upon execution of the printing, the user does not designate the media but designates the cassette or tray in which the media whose booklet printing is desired has been enclosed.

When a print executing command is instructed on the host computer 101, the print data is sent from the application 201 shown in FIG. 3 via the GDI (Graphics Device Interface). In step S402, if the middle binding booklet printing has been selected by the UI (User Interface) of the printer driver 203 shown in FIG. 6, the dispatcher 301 in FIG. 3 temporarily stores the transmitted print data as a spool file 303. This is because it is necessary to rearrange pages in order to perform the middle binding booklet printing or form a layout to which a blank amount or the like of the binding margin, which will be explained hereinlater, is reflected.

Subsequently, in step S403, whether the mode "Automatically adjust binding margin" has been selected from the UI of the printer driver 203 or not is discriminated. If the mode "Automatically adjust binding margin" is not selected, the processing routine advances to step S405. The layout of the booklet printing is formed by using a value set in "booklet binding margin" shown in FIG. 7 as a fixed value. After that, step S406 follows.

If the mode "Automatically adjust binding margin" has been selected in step S403, the processing routine advances to step S404. At this time, the adjustment value of the binding margin is automatically calculated with reference to the media type obtained by the foregoing method and the table (FIG. 9) showing the binding margin adjustment value of each media type which has previously been registered in the printer driver 203. After that, step S406 follows.

Although not shown in FIG. 4, if a printer having a plurality of paper feed units for enclosing the media has been connected, the user can designate the cassette or tray in which the desired media has been enclosed upon execution of the booklet printing. Upon obtainment of the media type mentioned above, it is sufficient to obtain and store the media type by associating the paper feed unit with the media enclosed therein in a manner such that the plain paper has been enclosed in the first paper feed unit and the bond paper has been enclosed in the second paper feed unit. With such a construction, the user designates the desired paper feed unit by the UI or the like (not shown), so that the printer driver 203 can automatically specify the media to be booklet-printed.

In step S406, the print data is printed by the printing unit 19 and, thereafter, the present processing routine is finished.

FIG. 9 is a diagram showing an example of a table in which adjustment values of the binding margin set every media type are shown as numerical values. The adjustment values of the respective media types shown in FIG. 9 are calculated by using sheets of paper recommended by printer companies so as to minimize deviation of images of each page upon booklet printing. As will be obviously understood by referring to the table shown in FIG. 9, the thinner a thickness of sheet is (for example, thin paper), the smaller the adjustment value of the binding margin is, while the thicker the media is, the larger the adjustment value is.

FIG. 6 is a diagram showing an example of a UI for selecting the booklet printing from the user interface of the printer driver. FIG. 7 is a diagram showing an example of a UI for selecting the mode "Automatically adjust binding margin" from the user interface of the printer driver 203.

How the page layout changes by the foregoing processes by changing the binding margin every page will be subsequently explained in detail with reference to FIGS. 5A, 5B and 5C.

First, in page layouts shown in FIGS. 5A to 5C, it is necessary that the following setting contents have previously been selected from the UI of the printer driver 203.

(1) The booklet printing has been selected from the UI of FIG. 6.
(2) 30 mm has been set as "booklet binding margin" from the UI of FIG. 7.

(3) The mode "Automatically adjust binding margin" has been selected from the UI of FIG. 7.
(4) The sheet of the media type "Plain" has been selected.
(5) 0.00045 mm has been set as an adjustment amount of the binding margin of "Plain" from the UI of FIG. 8.

To perform the booklet printing, first, it is necessary to rearrange the pages. That is, when the booklet printing is selected, the second and eleventh pages of an original (logic page) are printed on the obverse of the first page of the sheet and the first and twelfth pages of the original (logic page) are printed on the reverse of the first page of the sheet, respectively. Similarly, the fourth and ninth pages of the original (logic page) are printed on the obverse of the second page of the sheet and the third and tenth pages of the original (logic page) are printed on the reverse of the second page of the sheet, respectively. Similarly, the sixth and seventh pages of the original (logic page) are printed on the obverse of the third page of the sheet and the fifth and eighth pages of the original (logic page) are printed on the reverse of the third page of the sheet, respectively.

The 2nd and 11th pages of the original locating on the obverse of the 1st page of the sheet are arranged in positions which are away from the center by 30 mm as shown in FIG. 5A, respectively. This is because 30 mm has been preset as a set value of the "booklet binding margin" in the booklet detail display screen of the printer driver UI shown in FIG. 7. Subsequently, the 4th and 9th pages of the original locating on the obverse of the 2nd page of the sheet are arranged in positions which are away from the center by "30 mm-0.00045 mm" as shown in FIG. 5B, respectively. This is because since the 2nd page is located physically on the inner side of a book than the 1st page in the case where the sheets are booklet-bound and stapled at the middle position, unless the binding margin of the page on the inner side is set to be smaller than that of the page on the outer side by an amount corresponding to the thickness of sheet, the layout is deviated. In a manner similar to the above, the 3rd page is arranged in a position which is away from the center by "30 mm-(0.00045×2 mm)" as shown in FIG. 5C.

In FIGS. 5B and 5C, hatched regions are portions where the inside sheet overflows the outside sheet (the 1st page) due to an influence of a folding width when the sheet is middle-bound and folded at the center. Therefore, after completion of the booklet printing, by cutting the portions overflowing from the 1st page, a brochure of very high precision with the aligned layout can be formed.

By the above processes, since the binding margin upon booklet printing can be automatically calculated on the basis of the media type information, automatic adjustment of the binding margin according to the thickness of sheet can be made. The booklet printing of higher precision can be realized.

In the embodiment, the adjustment amounts of the binding margins of a plurality of media types have been held as a table and the adjustment amount has been changed in accordance with the media whose printing mode has been designated to be the booklet printing mode. However, it is also possible to change the adjustment amount on the basis of the number of sheets instead of changing the adjustment amount in accordance with the media type. According to such a method, by applying the invention to a print system such that there are only one or a few media type which can be used for booklet printing or a print system such that the adjustment amounts of the binding margins of a plurality of media types are not held as a table, the middle binding booklet printing of high precision can be performed.

Specifically speaking, if a sheet (sheet serving as an obverse sheet/reverse sheet) which becomes the outside upon booklet printing is assumed to be the 1st sheet, the set value of the booklet binding margin shown in FIG. 7 is applied as a binding margin of the 1st sheet. Subsequently, for the 2nd sheet, a value obtained by subtracting a preset adjustment value from the set value of the booklet binding margin is set as a binding margin. For the 3rd sheet, a value in which a value obtained by multiplying the adjustment value by 2 is subtracted from the set value of the booklet binding margin is set as a binding margin.

That is, it is now assumed that the set value of the booklet binding margin is set to 30 mm, the preset adjustment amount is set to 0.00045 mm, the number of sheets to be printed is set to N, the sheet (sheet serving as an obverse sheet/reverse sheet) which is used as an outermost side upon booklet printing is set to the 1st sheet, and the number of sheets is counted. In this case, a binding margin S of the Nth sheet is calculated by the following equation.

$$\text{Binding margin } S \text{ of the Nth sheet}=30 \text{ mm}-(0.00045 \text{ mm}\times(N-1))$$

As mentioned above, in the print system without the adjustment value table of the binding margin set every media type, the value of the binding margin of each sheet is adjusted on the basis of the number of sheets to be booklet-printed, so that the booklet printing having the excellent layout can be realized.

Second Embodiment

The second embodiment of the invention will now be described with reference to FIG. 8.

In the foregoing first embodiment, the booklet printing has been performed by using the adjustment value of the binding margin which has previously been calculated every media type. In the second embodiment, the user can arbitrarily change the adjustment amount of the binding margin. Since a construction of the second embodiment other than contents, which will be explained hereinbelow, is similar to that of the foregoing first embodiment, its explanation is omitted here.

FIG. 8 is a diagram showing a UI which is displayed when the detail button 701 displayed in the booklet detail display screen in FIG. 7 is selected. A default value of the adjustment amount of the binding margin is displayed every media type here. The "default value" used here denotes the adjustment amount of the binding margin calculated by measurement. However, since the adjustment amount of the binding margin is a very small value, there is a possibility such that it is slightly influenced also by an environment of an office, for example, by a humidity or a temperature.

The embodiment is effective in such a case and if the layout upon booklet printing is not preferably aligned even when the default adjustment value is used, adjustment of the user's desired layout can be made by arbitrarily changing the adjustment amount of the binding margin from the UI shown in FIG. 8.

Third Embodiment

The third embodiment of the invention will now be described. In the foregoing first and second embodiments, the example in which the same type of sheets (media) are used for all pages upon booklet printing and the adjustment of the binding margin according to the media type is automatically or manually made under such a situation has been disclosed.

On the other hand, according to the third embodiment, the binding margin is adjusted in the case where a plurality of types of media to be booklet-printed exist mixedly. Since a construction of the third embodiment other than contents, which will be explained hereinbelow, is similar to that of the foregoing first embodiment, its explanation is omitted here.

Figure 10A:
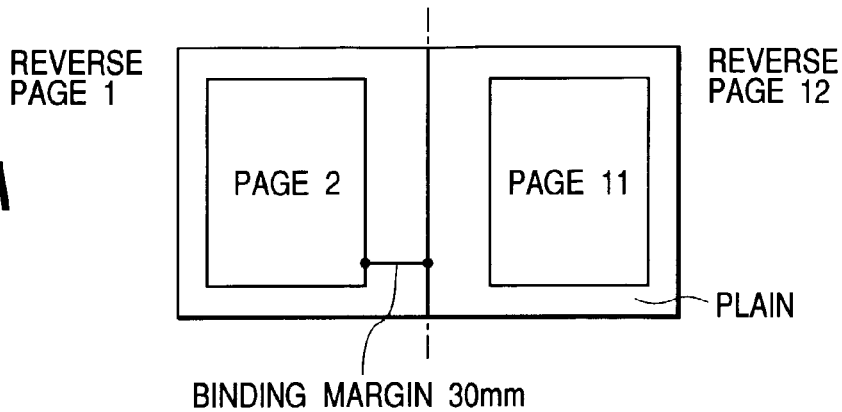
FIGS. 10A, 10B and 10C are diagrams showing layout processes in the case where a booklet binding margin of 30 mm has been set and plain paper and bond paper exist mixedly in a print system according to the third embodiment of the invention.
Figure 10B:
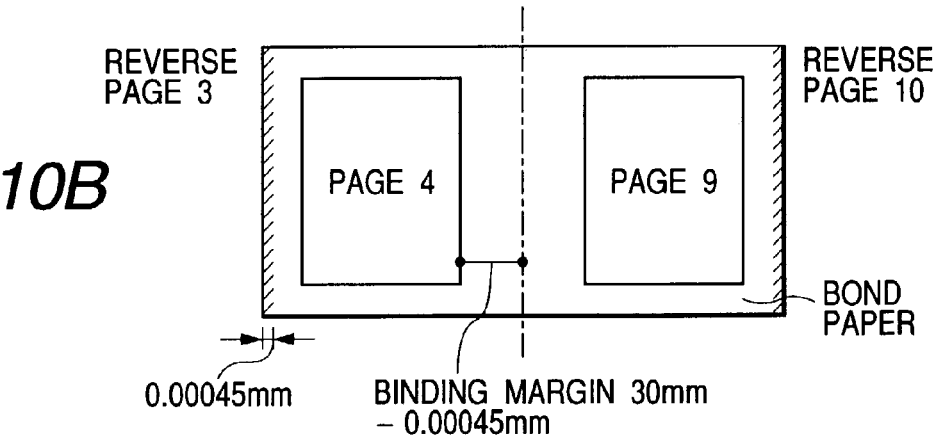
Figure 10C:
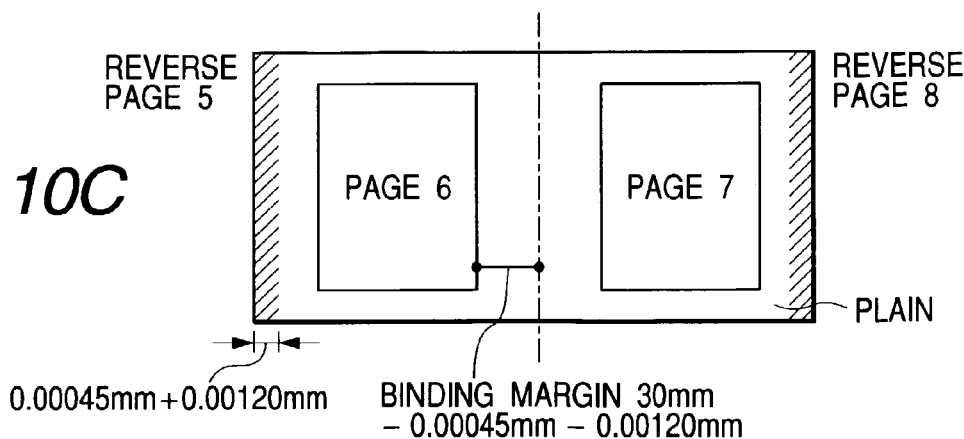

FIGS. 10A, 10B and 10C are schematic diagrams showing adjustment of a binding margin in the case where a plurality of types of media which are used in the booklet printing exist mixedly in the third embodiment. FIG. 10A shows a state where the first sheet (sheet serving as an obverse sheet/reverse sheet) which is subjected to the middle binding booklet printing is plain paper. FIG. 10B shows a state where the second sheet is bond paper. FIG. 10C shows a state where the third sheet is plain paper. It is now assumed that the set value of the booklet binding margin is equal to 30 mm in a manner similar to the case of the first embodiment and the adjustment amount set to each media is the same as that in the contents shown in FIG. 9.

First, 30 mm as a set value of the booklet binding margin is applied as a binding margin of the first sheet. Thus, the position which is away from the center of the sheet by 30 mm becomes a center side edge portion of the printing areas (showing areas surrounded by frames, as Page 2 and Page 11). The 2nd and 11th pages of the logic page are printed, respectively.

Subsequently, a value in which 0.00045 mm as an adjustment value of the plain paper as a media of the first sheet is subtracted from the set value 30 mm of the booklet binding margin is set as a binding margin of the second sheet. Thus, the position which is away from the center of the sheet by (30 mm−0.00045 mm) becomes the center side edge portion of the printing area. The 4th and 9th pages of the logic page are printed, respectively.

Subsequently, a value in which 0.00120 mm as an adjustment amount of binding margin of the bond paper as a media of the second sheet is further subtracted from the binding margin of the second sheet is set as a binding margin of the third sheet which uses the plain paper again. Thus, the position which is away from the center of the sheet by (30 mm−0.00045 mm−0.00120 mm) becomes the center side edge portion of the printing area. The 6th and 7th pages of the logic page are printed, respectively.

Thus, even in the case where a plurality of types of media to be used in the middle binding booklet printing exist mixedly, the booklet layout of high precision can be realized without being influenced by the media types.

To realize the booklet printing of such a media mixture type, a condition such that a cassette in which a plurality of types of media or different media have been enclosed can be designated for each page by the UI of the printer driver 203 is set as a prerequisite.

Fourth Embodiment

The fourth embodiment of the invention will now be described with reference to FIGS. 11 and 12.

Since a fundamental construction of a print system according to the fourth embodiment is the same as that shown in FIGS. 1 to 3 of the foregoing first embodiment, it will be explained also with reference to those diagrams.

In the first and second embodiments, the layout change in the booklet printing has been made by the printer driver 203 of the host computer 101. There is also a method whereby such a change is made on the printer 102 side.

A control method in the case where the printer driver 203 notifies the printer 102 of information necessary for booklet printing by a PJL command (command defined by a PCL language) and the actual layout adjustment is made by the printer 102 will be explained in detail with reference to FIG. 11.

Figure 11:
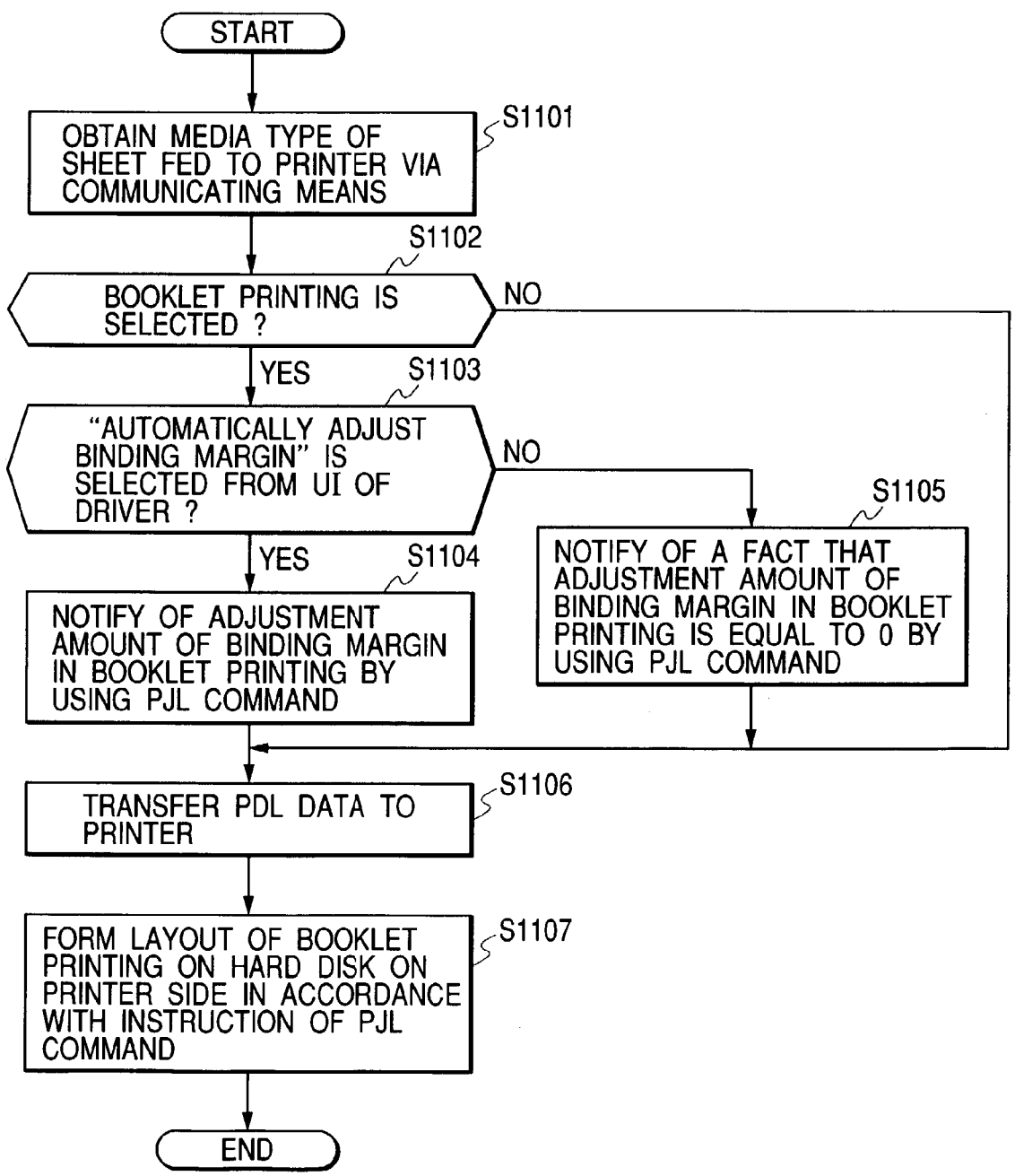
FIG. 11 is a flowchart showing a flow for a control operation in the case where a layout operation of the booklet printing is executed on the printer side in a print system according to the fourth embodiment of the invention.

FIG. 11 is a flowchart showing a flow for a processing operation in the case where the booklet printing is executed on the printer 102 side in the print system according to the fourth embodiment.

In step S1101 in FIG. 11, the host computer 101 and the printer 102 transmit and receive information via the network such as an SNMP or the like which can make bidirectional communication. At this time, the trigger timing for obtaining the apparatus information can be set by the printer driver 203 or the printer 102. The timing for obtaining the apparatus information can be set to the timing when the user gives an instruction from the graphic user interface of the printer driver 203 or the timing when he gives an instruction from the operation of the operation unit 20 or the like of the printer 102. Naturally, there is also a method of automatically transmitting and receiving the apparatus information every set time. Thus, the printer driver 203 can obtain the media type of the sheet fed to the printer 102.

When the print executing command is instructed on the host computer 101, the print data is sent from the application 201 shown in FIG. 3 via the GDI (Graphic Device Interface). In step S1102, if the booklet printing is not selected from the UI (User Interface) of the printer driver 203, step S1106 follows. In step S1102, if the middle binding booklet printing has been selected from the UI (User Interface) of the printer driver 203, the printer driver 203 notifies the printer 102 that the middle binding booklet printing has been selected by using a PJL command shown in FIG. 12 (@PJL COMMENT CANPJL SET BOOKLET=ON is a command showing that the booklet printing has been instructed). In step S1103, whether "Automatically adjust binding margin" has been selected from the UI of the printer driver 203 or not is discriminated.

If "Automatically adjust binding margin" has been selected from the UI of the printer driver 203, step S1104 follows. The adjustment amount of the binding margin of the media type obtained in step S1101 is set into the PJL command and notified at the printer 102 (@PJL COMMENT CANPJL SET GAP=00045 is a command showing that the adjustment amount of the binding margin and denotes that the adjustment amount is deviated by 0.00045 mm every page). After that, step S1106 follows.

In step S1103, if "Automatically adjust binding margin" is not selected from the UI of the printer driver 203, in step S1105, the printer 102 is notified of the fact that the adjustment amount of the binding margin in the booklet printing is equal to zero (0) by using the PJL command. After that, step S1106 follows.

Since those commands have been disclosed as comments of the PDL, even if the job is erroneously sent to a printer which does not support such a function, the printer does not cause an erroneous operation.

In step S1106, the printer driver 203 transfers the PDL data to the printer 102. In next step S1107, when the printer 102 receives those PJL commands from the printer driver 203, rearrangement of the pages or a layout process for outputting which takes into consideration the adjustment of the binding margin are executed to image data of each page developed on the hard disk of the printer 102. The print image subjected to the layout process of the booklet printing is sent to the printer engine, so that substantially the same print output as that in the case where the booklet printing is performed by the printer driver 203 can be executed.

In the print system comprising the information processing apparatus as a host computer and the printing apparatus serving as a printer, the adjustment of the binding margin can be also made on the printer side.

As described above, according to the invention, since the value of the optimum binding margin (blank) upon booklet printing can be set every media type, the booklet printing of higher precision can be performed.

What is claimed is:

1. An information processing apparatus which can communicate with a printing apparatus that can perform middle binding booklet printing, comprising:
   receiving means for receiving designation of the middle binding booklet printing;
   memory means for storing a preset blank adjustment amount in booklet printing;
   blank adjusting means for, when the designation of the middle binding booklet printing is received, automatically adjusting a blank amount from a binding position sheet by sheet on the basis of the blank adjustment amount stored in said memory means; and
   media information obtaining means for obtaining information regarding a plurality of media enclosed in said printing apparatus,
   wherein the blank adjustment amount stored in said memory means is a value which has been preset for each medium of the plurality of media, and
   wherein said blank adjusting means automatically adjusts the blank amount from the binding position sheet by sheet on the basis of said obtained media information and the blank adjustment amount stored in said memory means.

2. An apparatus according to claim 1, wherein the blank adjustment amount for each medium of the plurality of media stored in said memory means is a value set on the basis of a thickness of media.

3. An apparatus according to claim 1, further comprising changing means which can change said preset blank adjustment amount for each medium of the plurality of media.

4. A control method for an information processing apparatus which can communicate with a printing apparatus that can perform middle binding booklet printing, comprising:
   a receiving step of receiving designation of the middle binding booklet printing;
   a memory step of storing a preset blank adjustment amount in booklet printing;
   a blank adjusting step of, when the designation of the middle binding booklet printing is received, automatically adjusting a blank amount from a binding position sheet by sheet on the basis of the blank adjustment amount stored in said memory step; and
   a media information obtaining step of obtaining information regarding a plurality of media enclosed in said printing apparatus,
   wherein the blank adjustment amount stored in said memory step is a value which has been preset for each medium of the plurality of media, and
   wherein, in said blank adjusting step, the blank amount from the binding position is automatically adjusted sheet by sheet on the basis of said obtained media information and the blank adjustment amount stored in said memory step.

5. A method according to claim 4, wherein the blank adjustment amount for each medium of the plurality of every media stored in said memory step is a value set on the basis of a thickness of media.

6. A method according to claim 4, further comprising a changing step which can change said preset blank adjustment amount for each medium of the plurality of media.

7. A computer-readable medium which stores a computer program for an information processing apparatus which can communicate with a printing apparatus that can perform middle binding booklet printing, wherein said program allows a computer to execute:
   a receiving step of receiving designation of the middle binding booklet printing;
   a memory step of storing a preset blank adjustment amount in booklet printing;
   a blank adjusting step of, when the designation of the middle binding booklet printing is received, automatically adjusting a blank amount from a binding position sheet by sheet on the basis of the blank adjustment amount stored in said memory step,
   wherein said program allows the computer to further execute a media information obtaining step of obtaining information regarding a media enclosed in said printing apparatus,
   wherein, the blank adjustment amount stored in said memory step is a value which has been preset for each medium of plurality of media, and
   wherein in said blank adjusting step, the blank amount from the binding position is automatically adjusted sheet by sheet on the basis of said obtained media information and the blank adjustment amount stored in said memory step.

8. A computer-readable medium which stores a computer program according to claim 7, wherein the blank adjustment amount for each medium of the plurality of media stored in said memory step is a value set on the basis of a thickness of media.

9. A computer-readable medium which stores a computer program according to claim 7, wherein said program allows the computer to further execute a changing step which can change said preset blank adjustment amount for each medium of the plurality of media.

10. An information processing apparatus which can communicate with a printing apparatus that can perform middle binding booklet printing, comprising:
    middle binding booklet printing receiving means for receiving designation of the middle binding booklet printing;
    blank amount automatic adjustment receiving means for receiving designation to automatically adjust a blank amount from a binding position in the middle binding booklet printing; and
    blank adjusting means for, when the designation of the middle binding booklet printing and the designation of the automatic adjustment of the blank amount are received, setting a blank amount of each sheet other than a sheet serving as an obverse sheet and a sheet serving as a reverse sheet to a value in which a predetermined value is subtracted step by step from the blank amount from the binding position of each of the sheet serving as an obverse sheet and the sheet serving as a reverse sheet.

11. An apparatus according to claim 10, wherein said blank adjusting means adjusts the blank amount in accordance with the number of sheets.

12. An apparatus according to claim 10, wherein said blank adjusting means adjusts the blank amount in accordance with a type of sheet.

13. A control method for an information processing apparatus which can communicate with a printing apparatus that can perform middle binding booklet printing, comprising:
- a middle binding booklet printing receiving step of receiving designation of the middle binding booklet printing;
- a blank amount automatic adjustment receiving step of receiving designation to automatically adjust a blank amount from a binding position in the middle binding booklet printing; and
- a blank adjusting step of, when the designation of the middle binding booklet printing and the designation of the automatic adjustment of the blank amount are received, setting a blank amount of each sheet other than a sheet serving as an obverse sheet and a sheet serving as a reverse sheet to a value in which a predetermined value is subtracted step by step from the blank amount from the binding position of each of the sheet serving as an obverse sheet and the sheet serving as a reverse sheet.

14. A method according to claim 13, wherein in said blank adjusting step, the blank amount is adjusted in accordance with the number of sheets.

15. A method according to claim 13, wherein in said blank adjusting step, the blank amount is adjusted in accordance with a type of sheet.

16. A computer-readable memory medium which stores a control program for an information processing apparatus which can communicate with a printing apparatus that can perform middle binding booklet printing, wherein said program allows a computer to execute:
- a middle binding booklet printing receiving step of receiving designation of the middle binding booklet printing;
- a blank amount automatic adjustment receiving step of receiving designation to automatically adjust a blank amount from a binding position in the middle binding booklet printing; and
- a blank adjusting step of, when the designation of the middle binding booklet printing and the designation of the automatic adjustment of the blank amount are received, setting a blank amount of each sheet other than a sheet serving as an obverse sheet and a sheet serving as a reverse sheet to a value in which a predetermined value is subtracted step by step from the blank amount from the binding position of each of the sheet serving as an obverse sheet and the sheet serving as a reverse sheet.

17. A computer-readable medium which stores a computer program according to claim 16, wherein, in said blank adjusting step, the blank amount is adjusted in accordance with the number of sheets.

18. A computer-readable medium which stores a computer program according to claim 16, wherein, in said blank adjusting step, the blank amount is adjusted in accordance with a type of sheet.

* * * * *

UNITED STATES PATENT AND TRADEMARK OFFICE
CERTIFICATE OF CORRECTION

PATENT NO. : 7,319,539 B2 Page 1 of 1
APPLICATION NO. : 10/401838
DATED : January 15, 2008
INVENTOR(S) : Yamamura It is certified that error appears in the above-identified patent and that said Letters Patent is hereby corrected as shown below:

COLUMN 6:
Line 54, "executives" should read -- execute --.

COLUMN 7:
Line 10, "(plain)." should read -- plain. --.

COLUMN 9:
Line 63, "type" should read -- types --.

Signed and Sealed this

Nineteenth Day of August, 2008

JON W. DUDAS
*Director of the United States Patent and Trademark Office*